O. A. PEDERSEN.
TELEPHONE COLLECTION BOX APPARATUS.
APPLICATION FILED JAN. 25, 1913.
1,374,760.
Patented Apr. 12, 1921.
2 SHEETS—SHEET 1.
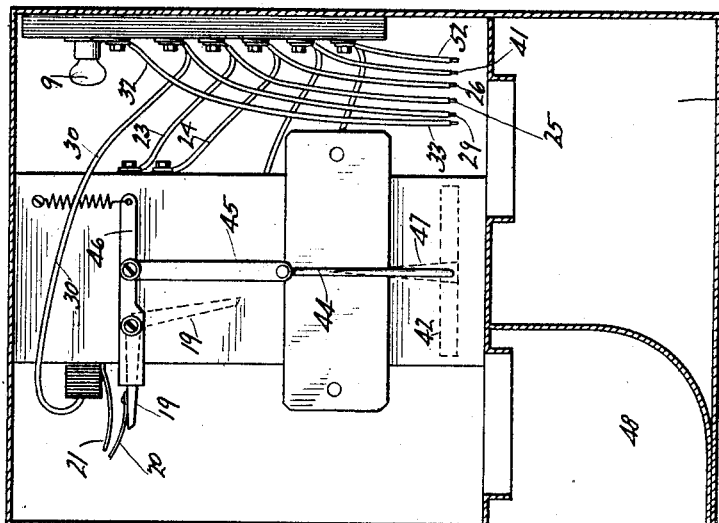
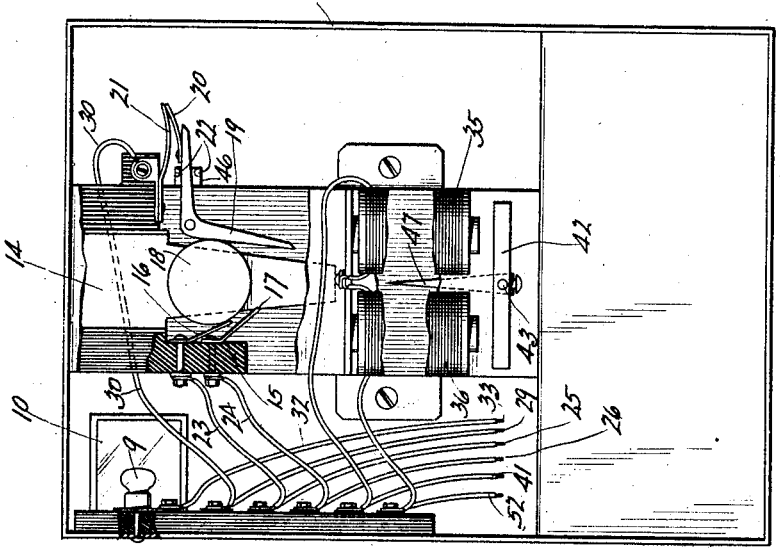
WITNESSES
INVENTOR
Oscar A. Pedersen
BY
ATTORNEYS O. A. PEDERSEN.
TELEPHONE COLLECTION BOX APPARATUS.
APPLICATION FILED JAN. 25, 1918.

1,374,760.

Patented Apr. 12, 1921.

WITNESSES

INVENTOR
Oscar A. Pedersen
BY
ATTORNEYS

UNITED STATES PATENT OFFICE.

OSCAR A. PEDERSEN, OF NEW YORK, N. Y.

TELEPHONE-COLLECTION-BOX APPARATUS.

1,374,760.

Specification of Letters Patent.   Patented Apr. 12, 1921.

Application filed January 25, 1918. Serial No. 213,685.

*To all whom it may concern:*

Be it known that I, OSCAR A. PEDERSEN, a citizen of the United States, and a resident of the city of New York, borough of the Bronx, in the county of Bronx and State of New York, have invented a new and Improved Telephone-Collection-Box Apparatus, of which the following is a full, clear, and exact description.

Among the principal objects which the present invention has in view are: To secure prepayment for telephonic services in multi-branch installations; to provide a fee prepayment system for house telephones; and to avoid interference in the use of the branches of said system.

Drawings.

Figure 1 is a front view of a coin-receiving station box apparatus, the face of the box and portions of the structure of the mechanism therein contained being removed to expose the inner construction of the apparatus;

Fig. 2 is a rear view of the same, the back being removed to show the construction of the apparatus;

Figure 3:
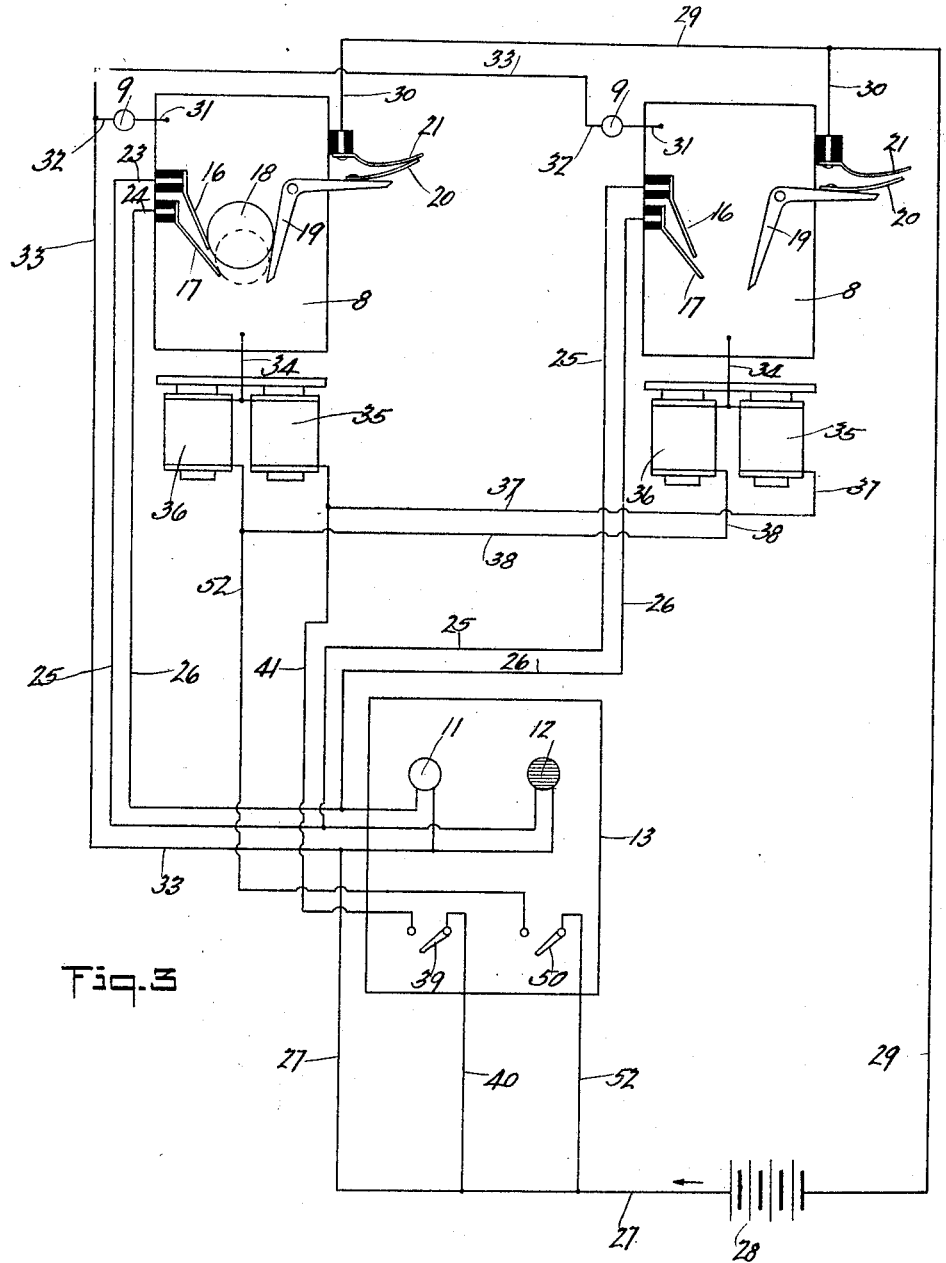
Fig. 3 is a schematic view showing diagrammatically the coöperative arrangement of the various parts of the apparatus.

Description.

The present invention is a development of the mechanism shown and described in United States Letters Patent for improvements in telephone collection boxes, numbered 1,254,533, granted to me January 22, 1918, to which cross reference is here made.

The apparatus shown in the drawings is particularly designed for employment in apartment houses where a local central instrument is provided with a number of branches, each branch having a transmitting and receiving instrument adapted for operative connection with the central instrument. The central instrument in many installations of the character mentioned, is attended by the janitor, elevator attendant, or other employee, and charges for the service are made to the various attendants in accord with their employment of the service. In the usual practice where records are kept by the attendant, disputes arise. To avoid these disputes, the apparatus and box set forth in the above-mentioned application was devised, whereby the person purposing to use the telephone preliminarily deposits the fee therefor. Out of this practice has arisen confusion and annoyance owing to the fact that a second or third user has made the necessary payment while the telephone was employed, and when the fee for the one use was collected, the fees for both uses were taken, with the consequent annoyance to the second or subsequent depositor of the fee.

To avoid the above-mentioned difficulty, the present apparatus provides a series of boxes 8. In each box is mounted an electric glow lamp 9 and a peep window 10, through which the lamp may be seen. The lamps 9 in the various stations are operatively connected and when the lighting circuit of any one of the lamps is closed, the lighting circuits of all of the lamps are closed, including one or the other of the fee-designating lamps 11 and 12 disposed on the attendant's board 13. The various boxes 8 are disposed adjacent the telephone instrument and each has a coin chute 14. There are two or more chutes 14, each being constructed to a width corresponding with circulating coins of different denominations. Usually the dimes and nickels, or ten-cent pieces and five-cent pieces of the currency are used in the apparatus and the chutes 14 are constructed to a width corresponding therewith. At the lower end of the chutes 14, insulating blocks 15 are mounted for supporting the electric terminal wipers 16 and 17. The wipers 16 and 17 vary in length in correspondence with coins, such as indicated by the numeral 18, to be used therewith.

It will be understood that the wipers 16 are each disposed in one of the chutes 14. For simplicity of illustration in this application, only one chute is shown, that being the larger or what is here denominated as the "nickel" chute, and the numeral 18 indicates a coin of this denomination.

Extending into each of the chutes and opposite each of the wipers 16 and 17, is a trigger 19. The trigger 19 coöperates with both wipers 16 and 17 for supporting the coin 18. The trigger 19 has a horizontal arm whereon is mounted the spring terminal 20, which when actively disposed makes contact with a spring terminal 21. The movement of the trigger 19 is regulated by two stop members 22, which are extended from a rocking lever 46 to limit the movement of the trigger. The wipers 16 and 17 are supported in the block 15 by small bolts which extend through the said block to operate as terminals for the jumpers 23 and 24. As shown best in Fig. 3, the jumpers 23 and 24 form parts of independent selective circuits, which incorporate the line wires 25 and 26 and the lamps 12 and 11, respectively. The lamps 11 and 12 are both connected with the ground wire 27, which leads to the electric source or battery 28. The opposite terminal of the battery 28 is connected with the lead 29, which is connected with the jumpers 30, the latter being electrically connected with the terminal 21.

In Fig. 3 of the drawings, two coin-receiving apparatuses are shown. It is obvious that as many such apparatuses as desired may be employed, and that the construction of these apparatuses with respect to the coin-operating mechanism is the same. Also it is evident that if the coin 18 forms a contact between the trigger 19 and the wiper 16 in any of the boxes 8, the coin in said box establishes an operating circuit incorporating the battery 28 and the lamp 12. It is also evident that if the coin which connects the trigger 19 and wiper 17, is used in any of the boxes 8, the circuit completed is that in which the lamp 11 is incorporated. Thus it will be seen that at the operating station and upon the board 13 thereof, a light signal will be given showing the operator that a coin has been dropped in one or another of the tier of boxes 8, and also will indicate the denomination of the coin. At the same time this information is given to the operator at the board 13, the users of the various stations are advised of the fact that one of the stations is using the telephone.

By reference to Fig. 3 of the drawings, it will be seen that each of the lamps 9 is electrically connected with the metal of the boxes 8, by one of the grounds 31, and by a jumper 32 with a lead wire 33, which is connected to the ground wire 27 and by it to the battery 28.

It will also be noted that each box 8 is connected by the jumpers 34, to the windings of the spool magnets 35 and 36, fixedly mounted within the boxes 8 to operate the throw for delivering the coin as hereinafter described. The spool magnets 35 and 36 are mounted in series, the series wires shown in Fig. 3 being indicated by the numerals 37 and 38, and the said wires incorporating in working circuits, the various spool magnets 35 and 36, respectively.

With such an equipment, it will now be observed by reference to Fig. 3 of the drawings, that when the coin 18 closes the operating circuit for the lamp 12, it likewise closes a lighting circuit for the two lamps 9. This circuit may now be traced as flowing from the battery 28, through the lead wires 27 and 33, to the lamps 9, and through the lamp at the right-hand of the figure by way of the box 8 at the right-hand of the figure, through the coils of the spool magnets 35 and 36, and the jumper 34 connecting the same with the box still at the right-hand of the figure; thence through either or both of the series wires 37 and 38 and coils of the spool magnets 35, 36 at the left of the figure by way of the jumper 34 at the left of the figure, through the box 8 at the left of the figure, and thence through the trigger 19 at the left of the figure, and the engaged terminals 20 and 21 through the jumper 30 to the lead 29, and return to the battery 28.

The same action and the same circuit applies equally when the coin electrically connects the trigger 19 and the wiper 17. Hence, it will be seen that whenever a coin of any denomination is dropped into the chute 14 of the apparatus, the lamps 9 in each and all of the various apparatuses glow, thereby notifying every subsequent perspective user of the apparatus that the apparatus is being used.

In the particular operation for which the present invention is designed, the operator at the local telephone switchboard having received instructions from the person intending to use the telephone, notifies the user to deposit the necessary coin. This is done. If it is found that connection cannot be made, the operator may return the coin by closing the switch 39, which places the battery 28 in circuit with the various spool magnets 35. This circuit may be traced from the battery 28, through the ground wire 27, to the branch 40, switch 39, lead 41, magnet 35, jumper 34, box 8, trigger 19, closed terminals 20 and 21, lead 29, to the battery 28.

By reference to Fig. 1 of the drawings, it will be seen that when the spool magnet 35 shown therein is energized, the rocking armature 42 is rocked on its pivot support 43. The support 43 is a wire which after passing through suitable bearings in the frame of the chute, is upturned at the back of the apparatus, as seen best in Fig. 2 of the drawings, to form the oscillating arm 44. The arm 44 is pivotally connected with a link 45, which rocks the lever 46 with the trigger 19 so as to permit the retraction of the said trigger from the path of the coin 18 with which it is engaged. This operation drops the coin 18, with the concomitant that the operating circuit for the lamps 9, 11 and 12 is broken. As seen best in Fig. 1 of the drawings, the stop members 22 which control the movement of the trigger 19 when the same is moved by the coin 18, are mounted on the end of the lever 46. While the stop members 22 prevent the independent rotation of the trigger 19, they serve to retract said trigger fully to clear the passage for the coins when it is desired to pass the same.

Fixedly attached to the pivot support 43, is a diverting blade 47. As seen by reference to Figs. 1 and 2, when the armature 42 is rocked by the attraction of the spool magnet 35, the blade 47 is swung to the left of the position shown in Fig. 1, or to the right of the position shown in Fig. 2. When the coin is dropped, it is deflected by the said blade 47 to the left of the said blade, as shown in Fig. 2 of the drawings, for delivery into the tray 48, which has a finger opening 49 in the side thereof.

This is the operation when the attendant desires to return the coin to the prospective user of the apparatus for the reason that he has been unable to obtain the party or to make the proper connection for the call desired. If, however, the call has been completed, the attendant waits until the dropping of one of the darts on the local switchboard indicates the termination of the conversation. He then closes the switch 50, which energizes the spool magnets 36. It will be observed by reference to Fig. 1 of the drawings, that by energizing the magnet 36, the armature 42 is rocked in the opposite direction from that above described, with the result that the blade 47 is pitched to the opposite direction, and in position to divert the coin when released by the trigger 19, for deposit in the locked compartment with which each of the boxes 8 is provided.

Claims.

1. An apparatus as characterized embodying a terminal, a wiper, and a trigger having a terminal normally out of contact with the first terminal, and in position to engage the first terminal, the trigger being spaced from the wiper to permit of the disposal of a coin between the wiper and the trigger, the coin serving to move the trigger so the terminal thereon will be brought into engagement with the first terminal.

2. An apparatus as characterized embodying a trigger having a terminal, a second terminal in position to be engaged by the first terminal, two wipers, one spaced a greater distance from the trigger than the other, two lamps, two circuits leading from the lamps to the wipers respectively, and a circuit leading from the second mentioned terminal to the lamps.

3. An apparatus as characterized embodying a terminal, a wiper, a trigger having a terminal normally out of contact with the first terminal and in position to engage the first terminal, and a lamp having electrical communication with the trigger, the trigger being spaced from the wiper to permit of the disposal of a coin between the wiper and the trigger, the coin serving to move the trigger to a position where the terminal thereon will be brought into engagement with the first terminal.

4. An apparatus as characterized embodying a plurality of branch stations, each having a wiper, a trigger having a terminal and spaced from the wiper, and a second terminal in position to be engaged by the first terminal, a plurality of lamps, one at each branch station, and means connecting all the lamps electrically with the triggers at all the branch stations.

5. An apparatus as characterized embodying a plurality of branch stations, each having a wiper, a trigger having a terminal and spaced from the wiper, a second terminal in position to be engaged by the first terminal, a plurality of lamps, one at each branch, a plurality of electrical means, one at each branch for directing coins passing between the wipers and the triggers, a plurality of grounds, one at each branch connecting electrically each lamp with the trigger and the said electrical means at its branch, and a circuit connecting the electrical means at each branch with the said electrical means at the other branches.

6. An apparatus as characterized embodying a plurality of branch stations, each having a wiper, a trigger having a terminal and spaced from the wiper, a second terminal in position to be engaged by the first terminal, a plurality of lamps, one at each branch, a plurality of electrical means, one at each branch for directing coins passing between the wipers and the triggers, a plurality of grounds, one at each branch connecting electrically each lamp with the trigger and the said electrical means at its branch, a circuit connecting the electrical means at each branch with the said electrical means at the other branches, a central station having a lamp and a switch, a circuit having branches leading to the switch, the lamp at the central station and the lamps at the branch stations, a wire leading from the switch and having branches leading to the said electrical means, and a wire having branches leading from the second mentioned terminals at the branch stations.

7. An apparatus as characterized embodying a plurality of coin collecting devices, a plurality of signals one mounted at the station of each of said devices, a plurality of magnets having means for directing coins deposited in the devices, a circuit connecting the magnets, a plurality of circuits leading from the signals to the magnets, and open circuits leading from the second circuit to the signals and adapted to be completed by a coin deposited in any one of the said devices, and a circuit leading to the first circuit for energizing the magnets to direct the coins.

OSCAR A. PEDERSEN.